United States Patent
Lambert et al.

(10) Patent No.: US 7,190,789 B2
(45) Date of Patent: Mar. 13, 2007

(54) METHOD AND APPARATUS FOR FINITE FIELD BASIS CONVERSION

(75) Inventors: Robert Lambert, Cambridge (CA); Robert Gallant, Mississauga (CA); Ronald Mullin, Waterloo (CA); Scott A. Vanstone, Campbellville (CA)

(73) Assignee: Certicom Corp., Mississauga (CA)

( * ) Notice: Subject to any disclaimer, the term of this patent is extended or adjusted under 35 U.S.C. 154(b) by 727 days.

(21) Appl. No.: 09/933,720

(22) Filed: Aug. 22, 2001

(65) Prior Publication Data

US 2002/0025038 A1     Feb. 28, 2002

Related U.S. Application Data

(63) Continuation of application No. PCT/CA00/00187, filed on Feb. 28, 2000.

(30) Foreign Application Priority Data

Feb. 26, 1999   (CA) .................................. 2263056

(51) Int. Cl.
*H04L 9/00*     (2006.01)
(52) U.S. Cl. ........................... 380/44; 713/171
(58) Field of Classification Search ............. 380/44, 380/30, 283, 21, 9, 49, 50, 285, 280; 708/492, 708/204, 206, 442, 809; 713/168, 171
See application file for complete search history.

(56) References Cited

U.S. PATENT DOCUMENTS 5,854,759 A    12/1998   Kaliski, Jr. et al.
5,987,131 A *  11/1999   Clapp ........................ 713/171

(Continued)

FOREIGN PATENT DOCUMENTS

EP      0 381 523      8/1990

OTHER PUBLICATIONS

Menezes, Alfred J. et al., "Handbook of Applied Cryptography," 1997, p. 80-86, 168, CRC Press LLC, Boca Raton, USA.

*Primary Examiner*—Kim Vu
*Assistant Examiner*—T. B. Truong
(74) *Attorney, Agent, or Firm*—John R. S. Orange; Blake, Cassels & Graydon LLP

(57) ABSTRACT

A method and systems provided for basis conversion in a cryptographic system. The method comprises the steps of a first correspondent transmitting an element represented in the first basis to an intermediate processor, the intermediate processor converting the element into a second basis representation and forwarding the converted element to the first correspondent who then uses the converted element in a cryptographic operation. A further embodiment of the invention provides for the intermediate processor to perform the basis conversion on a field element and then forward the converted element to a second correspondent. A still further embodiment of the invention provides for the correspondents in a cryptographic scheme making use of a bit string as a function of a sequence of traces of a field element, wherein the bit string is a shared secret for performing certain cryptographic operations.

27 Claims, 2 Drawing Sheets

U.S. PATENT DOCUMENTS 6,141,420 A * 10/2000 Vanstone et al. ............. 380/30
6,286,022 B1    9/2001 Kaliski, Jr. et al.
6,389,442 B1 * 5/2002 Yin et al. ................... 708/492
6,446,205 B1 * 9/2002 Lenstra ....................... 713/168

* cited by examiner

METHOD AND APPARATUS FOR FINITE FIELD BASIS CONVERSION

This application is a continuation of international application number PCT/CA00/00187, filed on Feb. 28, 2000, and claims the benefit of Canadian Patent Application Number 2,263,056, filed on Feb. 26,1999 the content of which is incorporated herein by reference.

The present invention relates to cryptographic systems and more particularly, to the conversion of elements in a finite field having one basis to elements of a finite field having another basis and wherein the elements are used in a cryptographic operation.

BACKGROUND OF THE INVENTION

Cryptographic operations are generally implemented on elements in a finite field. Various finite fields are of interest to cryptographers for example, the multiplicative groups of prime fields F(p), the multiplicative group of finite fields of characteristic two, $F(2^n)$ and elliptic curve groups over finite fields, $E(F_p)$ or $E(F_{2^n})$. The elements in a given finite field are represented in terms of a basis for the finite field. The bases are also elements of the finite field.

Certain efficiencies may be realized in cryptographic operations by choosing a particular set of bases fot that finite field. For example, in the finite field $F(2^n)$, two common choices of bases are the polynomial basis and a normal basis. A problem arises though in the choice of basis since communication between the two parties, although using the same cryptographic scheme but having different bases elements, requires the parties to perform a basis conversion operation on the field elements in order to obtain the same cryptographic result.

In general, if we let $F(q^n)$ be a finite field, where q is a prime or a prime power, the degree of the field is n and its order is $q^n$. A basis for the finite field is a set of n elements $b_0, b_1, \ldots b_{n-1} \in F(q^n)$ such that every element A of the finite field can be represented uniquely as a linear combination of basis elements:

$$A = \sum_{i=0}^{n/} a_i b_i$$

where the $a_i \in F(q)$ are the coefficients. Arithmetic operations are then performed on this ordered set of coefficients.

It may be seen then generally that by using a different basis, a different ordered set of coefficients is used.

Various techniques have been implemented to convert between two choices of bases for a finite field. A conventional approach involves using a matrix multiplication, wherein basis conversion is performed using a change of basis matrix m, resulting in a matrix of size $m^2$. If m is typically 160 bits, then this occupies significant storage in devices such as a smart card. General finite field techniques are described in the "Handbook of Applied Cryptography", CRC Press, 1996 by S. A. Vanstone et al and incorporated herein by reference. Other techniques for basis conversion are described in U.S. Pat. No. 5,854,759 to Kaliski et al, also incorporated herein by reference.

SUMMARY OF THE INVENTION

The present invention seeks to provide a method and apparatus for basis conversion, that is generally efficient in terms of memory and computation time and is particularly adapted for use with smart cards and other low power cryptographic tokens.

In accordance with this invention, there is provided a method for basis conversion, the method comprising the steps of a first correspondent transmitting an element represented in a first basis to an intermediate processor; the intermediate processor converting the element into a second basis representation; forwarding said converted element to the first correspondent; and the first correspondent operating on the converted element in a cryptographic operation.

BRIEF DESCRIPTION OF THE DRAWINGS

These and other features of the preferred embodiments of the invention will become more apparent in the following detailed description in which reference is made to the appended drawings wherein.

DESCRIPTION OF THE PREFERRED EMBODIMENTS

Figure 1:
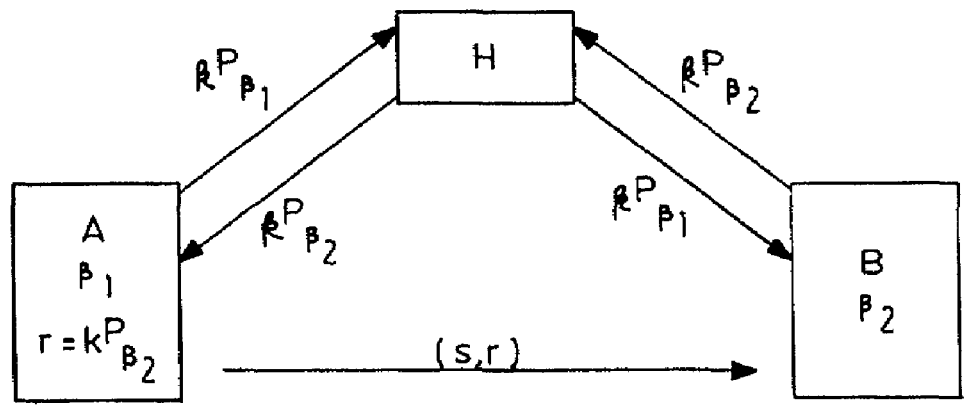
FIG. 1 is a schematic diagram of an embodiment of a basis conversion system in accordance with the present invention.

In a first embodiment, shown in FIG. 1 a pair of correspondents are represented by A and B and an intermediate processor, such as a server, certifying authority or other helper processor, represented by H. It is assumed the correspondents A and B include processors for performing cryptographic operations and the like that may be implemented in hardware or in software operated on a general purpose computer. In this case the software may be encoded as a data carrier such as a CD ROM or computer disk for loading on to the computer. Specifically, A and B perform cryptographic operations in a basis $\beta_1$ and $\beta_2$, respectively. It is further assumed that the respective cryptographic parameters are contained within the entities A and B. For example in an elliptic curve scheme the system parameters include at least a point P on the elliptic curve, the order of the curve and the parameters of the elliptic curve equation E.

In this embodiment, each of the entities A and B generates a respective random value $k_i$, generally the private session key and each computes a public value $k_iP$, represented in terms of their respective bases $\beta_1$ and $\beta_2$. One of the entities, A for example, transmits its public key $kP_{\beta 1}$ to the server H. The server H performs a basis conversion utilizing one of many basis conversion algorithms to convert the public key $kP_{\beta 1}$ represented in basis $\beta_1$ to a public key $kP_{\beta 2}$ represented in terms of the basis $\beta_2$. The converted key is transmitted back to the correspondent A. The correspondent A then computes signature $s=k^{-1}(h(m)+dr)$, where $r=kP_{\beta 2}$. The signature s and r are then transmitted to the other correspondent B, which is then processed by B in the basis $\beta_2$. Similarly if correspondent B wishes to communicate with A it also transmits its public key $kP_{\beta 2}$ to the server, which performs the conversion on the key and sends it back to the correspondent B. The correspondent B also computes a signature using $r=kP_{\beta 1}$.

In this embodiment, a helper or an intermediate processor is utilized to perform the basis conversion, thereby allowing relatively low power computing devices A and B to correspond, such as smart cards. Furthermore the cryptographic scheme is not compromised since the public key may be transmitted in the clear, without requiring a secure communication path between the correspondent and the server.

Figure 2:
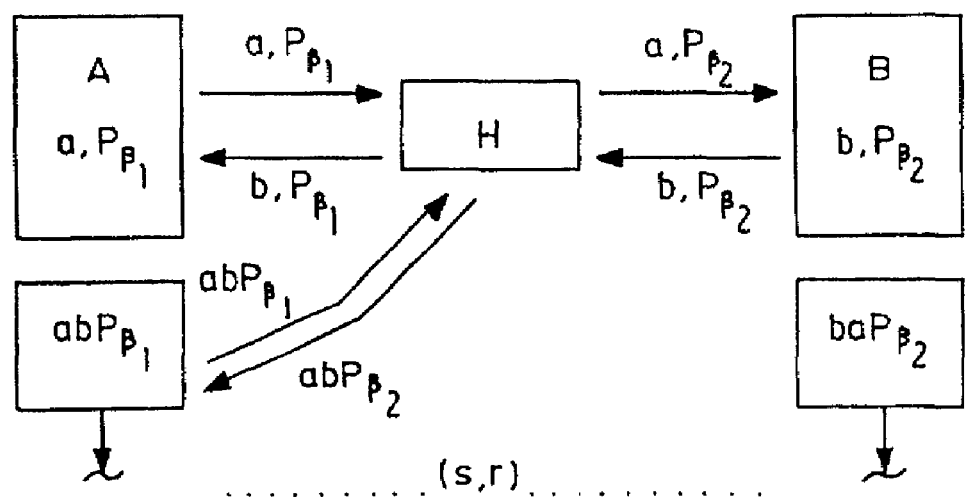
FIG. 2 is a schematic diagram of a further embodiment of a basis conversion system in accordance with the present invention.

Referring to FIG. 2, in a second embodiment each of the correspondents A and B have a respective public key aP represented in terms of basis $\beta_1$ and bP represented in terms of basis $\beta_2$. The first correspondent A transmits its public key aP to the server H which performs the basis conversion on the element to a representation basis $\beta_2$ and transmits this key $aP_{\beta 2}$ to the second correspondent B. The second correspondent B also transmits its public key $bP_{\beta 2}$ to the server where a basis conversion is performed on the key to the basis $\beta_1$ of the first correspondent. The key $bP_{\beta 1}$ is forwarded to the first correspondent A. Each of the correspondents then compute a common key by combining its private key with the other correspondents received public key. Thus, A computes $abP_{\beta 1}$ and B computes $baP_{\beta 2}$.

The correspondents have now performed a key exchange, each having a shared key, although represented in a different basis and only one of the correspondents need perform a basis conversion. The common keys may then be used in a conventional manner in subsequent steps of the encryption scheme.

In a third embodiment, again it is assumed that the correspondents A and B operate in bases $\beta_1$ and $\beta_2$ respectively. The bases $\beta_1$ and $\beta_2$ may represent any basis. Furthermore, we define a field element $\alpha$ such that correspondent A represents the element $\alpha$ in terms of the basis $\beta_1$, and correspondent B represents the field element $\alpha$ in terms of basis $\beta_2$. The correspondents make use of a bit string that is a function of a sequence of traces of the field element as a shared secret to perform the certain cryptographic operations.

In this embodiment if we let p be a prime and let $q=p^m$, where $m \geq 1$. Let $F_q$ be the finite field having q elements and $F_q^n$, the n-dimensional extension. The cyclic group G of $F_q^n$ over $F_q$ is generated by the mapping $\sigma(\alpha)=\alpha^q$, $\alpha \in F_q^n$, and is of order n. We may then define the trace function of $F_q^n$ over $F_q$ as $$Tr_{F_q^n | F_q}(\alpha) = \sum_{\eta \in G} \eta(\alpha) = \sum_{i=0}^{n-1} \alpha^{q^i}.$$

For brevity, the trace function is simply represented as Tr. The traces $Tr((\alpha_{\beta 1})$ and $Tr(\alpha_{\beta 2})$, have the property that the trace of an element $\alpha$ represented in terms of a basis $\beta_1$ is the same as the trace of the element a represented in terms of basis $\beta_2$.

If a key of length n=128 bits is to be constructed, then the traces of odd powers of $\alpha$ are taken. The traces, namely $Tr(\alpha)$, $Tr(\alpha^3)$, ... $Tr(\alpha^{257})$, are either 0 or 1. Since the trace is independent of the representation and it does not matter, which one of the entities performs the trace. As an aside it may be noted that we could also use the trace $Tr(f_1(\alpha))$ ... $Tr(f_k(\alpha))$ that is the trace of $F(2^n)$ maps to the elements [0,1] or F(2). Therefore, $f_1$ maps $F(2^n)$ to $F(2)$. In general, any invariant function may be utilized for the trace.

In general if $F(q^n)$ is the finite field and $F(q)$ is the ground field over which it is defined, the elements of the finite field can be represented in a number of ways depending on the choice of basis. Two common types of basis are polynomial basis and normal basis. If $\beta_1$ is a polynomial basis, then the basis elements may be represented as $1, \beta, \beta^2, \ldots \beta^{n-1}$, where $\beta$ is a root or generator. Assuming the function $f(x)=0$ and $f(x)$ is an irreducible of degree n i.e irreducible over the ground field, then, if a field element is given by $\alpha = a_0 + a_1 \beta^1 \ldots + a_{n-1}\beta^{n-1}$, the trace is given by $$Tr(a) = a_0 + a_1 Tr(\beta) + a_2 Tr(\beta^2) \ldots + a_{n-1} Tr(\beta^{n-1}).$$

It may be observed that the trace is linear and if the irreducible f(x) has the form $x^n + g(x)$ where the degree of g(x) is k, then $$Tr(\beta^j) = 0 \text{ for } j = 1, 2 \ldots n-k-1.$$

If the irreducible polynomial is given by $$x^n + a_{n-1} x^{n-1} + a_{n-2} x^{n-2} \ldots + a_1$$

and if $a_{n-1}=0$ then $Tr(\beta)=0$, and $a_{n-1}=0$ and $a_{n-2} 0$ then $Tr(\beta^2)=0$. The observation is that if consecutive coefficients of the field element $\alpha$ are zero then the trace of that number of terms is zero.

Thus, the trace bit string may be used as a shared secret to perform the remaining cryptographic operations. In deciding upon a key, the users (correspondents) normally select a bit string that is a function of a sequence of traces of a selected field element. For example if a bit string (key) of length 3 is desired, the trace of $\alpha$, $\alpha^3$, $\alpha^2$ could be used. The order of the sequence of traces may on occasion be arbitrarily chosen but known to the correspondents. The following examples more clearly illustrate the derivation of a key.

EXAMPLE 1

In this example the trace of $\alpha$ and $\alpha^3$ is used to create a binary key of length 2.

Basis 1: The irreducible chosen is $f(x)=x^3+x+1=0$; $x^3=x+1$

Element $\alpha$ in this basis is $\alpha=(1+x^2)$ then the key $=(Tr(\alpha), Tr(\alpha^3))$ $$Tr(1) = 1 + 1^2 + 1^4 = 1; \quad (x^4 = x^2 + x)$$

$$Tr(x) = x + x^2 + x^4$$
$$= x + x^2 + x^2 + x = 0$$

$$Tr(x^2) = x^2 + x^4 + x^8$$
$$= x^2 + (x^2 + x) + (x^2 + x)^2$$
$$= x + (x^2 + x) + x^2 = 0$$

$$Tr(\alpha) = Tr(1+x^2) = Tr(1) + Tr(x^2) = 1 + 0 = 1$$

$$\alpha = \alpha \cdot \alpha^2 = (1+x^2)(1+x^2)^2 = (1+x^2)(1+x^4)$$
$$= (1+x^2)(1+x+x^2)$$
$$= 1 + x + x^2 + x^2 + x^3 + x^4$$
$$= 1 + x + x^3 \qquad + x^4$$
$$= 0 + \qquad x^2 + x$$
$$= x^2 + x$$

$$Tr(\alpha^3) = Tr(x^2) + Tr(x) = 0 + 0 = 0$$

Thus the key=(1,0)

EXAMPLE 2

In this example a different basis is used (basis 2) and $\alpha$ is converted to its representation in this basis by (1) finding a root r for the polynomial for basis 1 in the representation generated by basis 2, and (2) then evaluating the polynomial representing $\alpha$ in basis 1 at r. The traces of $\alpha$ and $\alpha^3$ are calculated in basis 2 to generate the same binary key as was created in basis 1 above.

Basis 2: The irreducible chosen is $g(y)=y^3+y+1$; $y^3y^2+1$

To find $\alpha$ in basis 2, find a root of $f(x)=x^3+x+1$ (the irreducible in basis 1) in basis 2.

Note: $(y+1)^3+(y+1)+1=y^3+y^2+y+1+y+1+1=0+y+1+0$

Let $r=y+1$, then $\alpha=1+x^2 \to \alpha'=1+r^2=1+(y+1)^2=1+y^2+1=y^2$

Key=$(Tr(\alpha'), Tr(\alpha')^3)$; $y^4=y^3+y=y^2+y+1$ $Tr(1)=1+1+1$ $Tr(y)=y+y^2+y^4=y+y^2+y^2+y+1=1$ $$Tr(y2) = y^2 + y^4 + y^8 = y^2 + y^2 + y + 1 + (y^2 + y + 1)^2$$
$$= y + 1 + y^4 + y^2 + 1$$
$$= y^4 + y^2 + y$$
$$= y^2 + y + 1 + y^2 + y = 1$$

$Tr(\alpha')=Tr(y^2)=1$ $(\alpha')=y6=(y^3)^2=(y^2+1)^2=y^4+1=y^2+y+1+1=y^2+y$ $Tr((\alpha')^3)=Tr(y^2+y)=Tr(y^2)+Tr(y)=1+1=0$ Thus the key=(1,0) as in basis 1.

Figure 3:
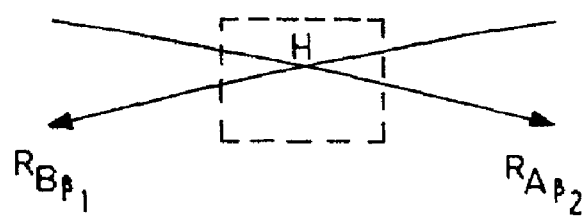
FIG. 3 is a flow diagram illustrating a key exchange scheme in accordance with an embodiment of the invention.

Referring to FIG. 3, a key agreement scheme shows the correspondents A and B operating in bases $\beta_1$ and $\beta_2$ respectively. The bases $\beta_1$ and $\beta_2$ may represent any basis. Furthermore A and B each have the following system parameters, a long term private key d and a long-term public key $Q_A=d_aP$ and $Q_B=d_bP$, where P is a point on an elliptic curve represented in terms of the respective bases. The correspondent A represents P in terms of the basis $\beta_1$ and correspondent B represents P in terms of basis $\beta_2$. In a typical Diffie-Hellman key agreement scheme, each of the correspondents A and B generate respective ephemeral private keys $k_A$ and $k_B$ and compute a corresponding short term (session) public keys $k_AP_{\beta 1}$ and $k_BP_{\beta 2}$. A and B exchange their respective public keys, and convert them to their own basis. If the correspondents are low power devices, such as smart cards or the like, then basis conversion may be performed by an intermediate processor such as described with reference to FIGS. 1 and 2. Alternatively, if the correspondents have sufficient compiling power, then basis conversion may be performed by the correspondents themselves, according to one of many basis conversion methods. In any event, after the basis conversion, correspondent A has B's public key $(k_BP_{\beta 2})_{\beta 1}$ and B has A's public key $(k_AP_{\beta 1})_{\beta 2}$. A shared secret is computed in their respective basis by computing $k_A(k_BP_{\beta 2})_{\beta 1}=\alpha_{\beta 1}$ and $k_B(k_AP_{\beta 1})_{\beta 2}=\alpha_{\beta 2}$. Each of the correspondents takes a sequence of traces of their respective field element $\alpha$ to derive a common bit string.

Applying the method to a signature scheme, the correspondent A generates its ephemeral public session key $kP_{\beta 1}$. A trace sequence may be constructed, for example, of the x-coordinate of $kP_{\beta 1}$ producing a bit string T. The bit string is passed through a hash function g to derive a signature component r. A second signature component $s=k^{-1}(m+dr)$ is computed, where d is A's long term private key. The signature components are transmitted to B for verification. The verifier B computes $E'ms^{-1}P_{\beta 2}+rs^{-1}Q_{A,\beta 2'}=kP_{\beta 2}$ where $Q_{A,\beta 2}$ is the long term public key of A in basis 2. This basis conversion could be performed by A using an intermediate H as described earlier. B then generates a sequence on the computed value $kP_{\beta 2}$, and applies the hash function g to derive a value r'. If r'=r, then the signature is verified.

Although the invention has been described with reference to certain specific embodiments, various modifications thereof will be apparent to those skilled in the art without departing from the spirit and scope of the invention as outlined in the claims appended hereto.

The embodiments of the invention in which an exclusive property or privilege is claimed are defined as follows:

1. A method for basis conversion between a pair of correspondents exchanging cryptographic data, said method comprising the steps of:
    transmitting an element represented in a first basis from a first correspondent to an intermediate processor;
    converting the transmitted element into a second basis representation by said intermediate processor to produce a converted element;
    forwarding said converted element to the first correspondent; and
    operating on said converted element by said first correspondent in a cryptographic
    operation to obtain a result of said cryptographic operation for use in exchanging cryptogaphic data with a second correspondent.

2. A method according to claim 1 further comprising the step of: transmitting a result of said cryptographic operation to said second correspondent.

3. A method according to claim 2, wherein said result is a signature.

4. A method according to claim 2 further comprising the step of transmitting said converted element by said intermediate processor to said second correspondent.

5. A method according to claim 2 further comprising the step of transmitting said converted element by said first correspondent to said second correspondent.

6. A method according to claims 4 and 5, wherein said converted element is a short term public key.

7. A method according to claims 4 and 5, wherein said converted element is a long term public key.

8. A method according to claim 1, wherein one of said correspondents is a low power computing device.

9. A method according to claim 8, wherein said low power computing device is a smartcard.

10. A method according to claim 1, wherein said cryptographic operation employs an elliptic curved scheme.

11. A method according to claim 1, wherein said intermediate processor is a Certifying Authority.

12. A method for information exchange between a pair of correspondents exchanging cryptographic data and operating in different bases, the method comprising the steps of:
    transmitting an element represented in a first basis from a first correspondent to an intermediate processor;
    transmitting a second element represented in a second basis from a second correspondent to said intermediate processor;
    converting the transmitted first element into said second basis representation by said intermediate processor to produce a first converted element;
    converting the transmitted second element into a first basis representation by said intermediate processor to produce a second converted element;
    forwarding said first converted element to said second correspondent; and
    forwarding said second converted element to said first correspondent.

13. A method according to claim 12 further comprising the step of operating on said second converted element by said first correspondent in a cryptographic operation to produce a result.

14. A method according to claim 13 further comprising the step of operating on said first converted element by said second correspondent in said cryptographic operation to produce a second result.

15. A method according to claims 13 and 14, wherein said converted elements are public keys.

16. A method according to claim 15, wherein said result is a common key shared between said correspondents.

17. A method according to claim 16 further comprising the step of employing said common key in subsequent steps of a cryptographic scheme.

18. A method according to claim 17, wherein said cryptographic scheme is an elliptic curve scheme.

19. In a cryptographic system utilizing elements of a finite field Fq, a method for generating a basis independent bit string for use in cryptographic operations, the method comprising the steps of:

representing as a vector of binary digits a first field element in terms of a first basis;

computing a first function of a first sequence of traces of the form $$\sum_{i=0}^{n-1} a^{q^i}$$

of said first field element; and using the result of such computation of said first function of said first sequence of traces as said bit string in subsequent cryptographic operations.

20. A method according to claim 19 further comprising the steps of:

representing as a vector of binary digits a second field element in terms of a second basis;

computing a second function of a second sequence of traces of said second field element; and using said second sequence of traces as said bit string.

21. A method according to claim 20, wherein said first function is equal to said second function.

22. A method according to claim 20, wherein an order of said sequence of traces is shared between a first correspondent and a second correspondent.

23. A method according to claim 20 further including the step of using said bit string as a shared secret in a cryptographic scheme between a first correspondent and a second correspondent.

24. A method according to claim 23, wherein said cryptographic scheme is an elliptic curved scheme.

25. A method according to claim 19, wherein said first function is an irreducible polynomial of degree N.

26. A method according to claim 20, wherein said second function is an irreducible polynomial of degree N.

27. A method according to claims 24 and 25, wherein said first field element is converted in terms of said second basis by finding a root for said polynomial for said first basis in a representation generated by said second basis; and evaluating said polynomial representing said first field element in said first basis at said root.

* * * * *